United States Patent
Bogenrieder et al.

(10) Patent No.: US 7,197,667 B2
(45) Date of Patent: Mar. 27, 2007

(54) METHOD AND DEVICE FOR CHECKING THE ERROR-FREE FUNCTION OF MODULES IN A BUS SYSTEM COMPRISING A CENTRAL UNIT

(75) Inventors: Hans-Georg Bogenrieder, Ingolstadt (DE); Holger Wulff, Ingolstadt (DE); Heiko Buehring, Oldenburg (DE); Ewald Mauritz, Weissach (DE); Klaus-Dieter Meier, Leonberg (DE); Bernd Pfaffeneder, Lappersdorf (DE)

(73) Assignees: Conti Temic microelectronic GmbH, Nuremberg (DE); Robert Bosch GmbH, Stuttgart (DE); Siemens Aktiengesellschaft, Munich (DE)

( * ) Notice: Subject to any disclaimer, the term of this patent is extended or adjusted under 35 U.S.C. 154(b) by 379 days.

(21) Appl. No.: 10/495,314

(22) PCT Filed: Nov. 13, 2002

(86) PCT No.: PCT/DE02/04189

§ 371 (c)(1),
(2), (4) Date: May 11, 2004

(87) PCT Pub. No.: WO03/047171

PCT Pub. Date: Jun. 5, 2003

(65) Prior Publication Data

US 2005/0076270 A1 Apr. 7, 2005

(30) Foreign Application Priority Data

Nov. 14, 2001 (DE) ................. 101 55 975

(51) Int. Cl.
*G06F 11/00* (2006.01)
(52) U.S. Cl. ............... 714/31; 714/43; 714/48; 701/29; 701/31; 701/48; 370/449; 370/450; 370/451; 370/459

(58) Field of Classification Search ........... 714/31, 714/43, 48; 701/29, 31, 48; 370/450, 451, 370/449, 459
See application file for complete search history.

(56) References Cited

U.S. PATENT DOCUMENTS 4,710,931 A 12/1987 Bellay et al.

(Continued)

FOREIGN PATENT DOCUMENTS

DE 19609076 8/1997

(Continued)

OTHER PUBLICATIONS

A. Steininger et al., "Economic Online Self-Test In the Time-Triggered Architecture", IEEE Design & Test of Computers, IEEE Computers Society, Los Alamitos, US, vol. 16, No. 3, Jul. 1999, pp. 81-89, XP000849067.

(Continued)

*Primary Examiner*—Robert Beausoliel
*Assistant Examiner*—Charles Ehne
(74) *Attorney, Agent, or Firm*—W. F. Fasse; W. G. Fasse

(57) ABSTRACT

The error-free function of modules in a bus system with a central unit is tested. First, all (error-free) modules are set into a silent operating mode in response to an agreed silence-command, and then in this silent operating mode it is tested whether all modules still remain silent, i.e. do not transmit data, in response to an agreed data request allocated to these modules. A module that nonetheless transmits data is recognized as faulty and is deactivated. Subsequently, all modules except for a module to be tested are set into the silent operating mode, and then it is tested whether this test module transmits its data in response to the agreed data requests allocated to it and remains silent in response to the data requests not allocated to it. Additionally, the position of the return-transmitted data can be determined and compared with a nominal position.

10 Claims, 3 Drawing Sheets

U.S. PATENT DOCUMENTS

| | | |
|---|---|---|
| 5,721,737 A | 2/1998 | Radjabi et al. |
| 5,841,968 A | 11/1998 | Caldera et al. |
| 5,892,893 A | 4/1999 | Hanf et al. |
| 6,081,044 A | 6/2000 | Anthofer et al. |
| 6,128,758 A | 10/2000 | Hall et al. |
| 6,208,924 B1 | 3/2001 | Bauer |
| 6,467,003 B1 * | 10/2002 | Doerenberg et al. ........ 710/117 |
| 6,728,908 B1 * | 4/2004 | Fukuhara et al. ............ 714/48 |

FOREIGN PATENT DOCUMENTS

| | | |
|---|---|---|
| DE | 19616293 | 10/1997 |
| DE | 19611945 | 11/1997 |
| DE | 19813954 | 5/1999 |
| EP | 0640919 | 3/1995 |
| EP | 69118099 | 10/1996 |
| EP | 0849122 | 6/1998 |

OTHER PUBLICATIONS

M. Gunzert et al., "Component-Based Development and Verification of Safety Critical Software for a Brake-By-Wire System With Synchronous Software Components", Software Engineering For Parallel And Distributed Systems, 1999, Proceedings, International Symposium, Los Angeles, CA, USA, May 17-18, 1999, Los Alamitos, CA, USA, IEEE Comput. Soc., US, pp. 134-145, XP010343696, ISBN: 0-7695-0101-5.

* cited by examiner

METHOD AND DEVICE FOR CHECKING THE ERROR-FREE FUNCTION OF MODULES IN A BUS SYSTEM COMPRISING A CENTRAL UNIT

FIELD OF THE INVENTION

The invention relates to a method for the testing of the error-free function of modules in a bus system with a central unit.

Bus systems for the data exchange between a central unit and a plurality of modules by means of a data protocol frame or framework, also for occupant protection systems, are, for example, known from the DE 196 09 076, DE 196 16 293, EP 0 849 122, or DE 198 13 954. In that context, a position within the data protocol frame is allocated to each module, at which position the module, in the error-free condition, transmits data to the central unit and/or the other modules in response to a command for a data inquiry or request in the normal operation.

Beside the failure of modules, which can be recognized from the missing or lack of the data in response to the data request, further errors that would interfere with the data exchange can, however, arise in the bus system or the modules. Thus, it was recognized, that modules were transmitting their data in response to data request commands other than those allocated to them, due to interferences in their memory, and partially also no longer transmit to the position allocated to them, due to interferences in the transmitting circuit, and thus an interference of the entire data exchange arises.

SUMMARY OF THE INVENTION

An object of the invention is to present a suitable method for the testing of the error-free function of modules in a bus system as well as corresponding apparatuses. Additionally, suitable modules as well as a corresponding central unit and a corresponding bus system are presented.

In that context, the basic underlying idea is an especially agreed command, in short called silence-command in the following, in response to which the modules in the error-free condition switch over into a silent operating mode and transmit no data even particularly in response to the agreed data request. This silence-command opens a series of testing possibilities.

Thus, respectively all of the modules except for a module to be tested are set into the silent operating mode and thereafter at least one, preferably all, data requests agreed for this module to be tested and/or at least one, preferably all of the data requests not agreed for this module are transmitted.

Thereby, it is tested or checked whether the module transmits its data in response to the agreed data request(s) and remains silent in response to the not agreed data requests. In the event of an error, an error routine is carried out, the corresponding module is, for example, deactivated or a reset is carried out.

Since the other modules are silent, additionally the position of the return-transmitted data can be determined and compared with a nominal or desired position. This is, as a rule, not possible in the normal operation, because therein the sections in the data protocol frame allocated to the modules are directly contiguous, and upon shiftings or offsets an overlap will be caused, from which it can no longer be distinguished who transmits when and where.

Since, however, possibly one module suffers interference in such a manner that it does not recognize the silence-command, preferably additionally in advance at first all modules are set into the silent operating mode, thereafter at least one, preferably all, data requests agreed at least for one of the modules are transmitted and thereby it is tested, whether one of the modules transmits data in response to the agreed data request(s) despite the silent operating mode.

BRIEF DESCRIPTION OF THE DRAWINGS

The invention shall be described in greater detail in the following in connection with example embodiments and figures. Short description of the figures.

DETAILED DESCRIPTION OF AN EXAMPLE EMBODIMENT OF THE INVENTION

Figure 1:
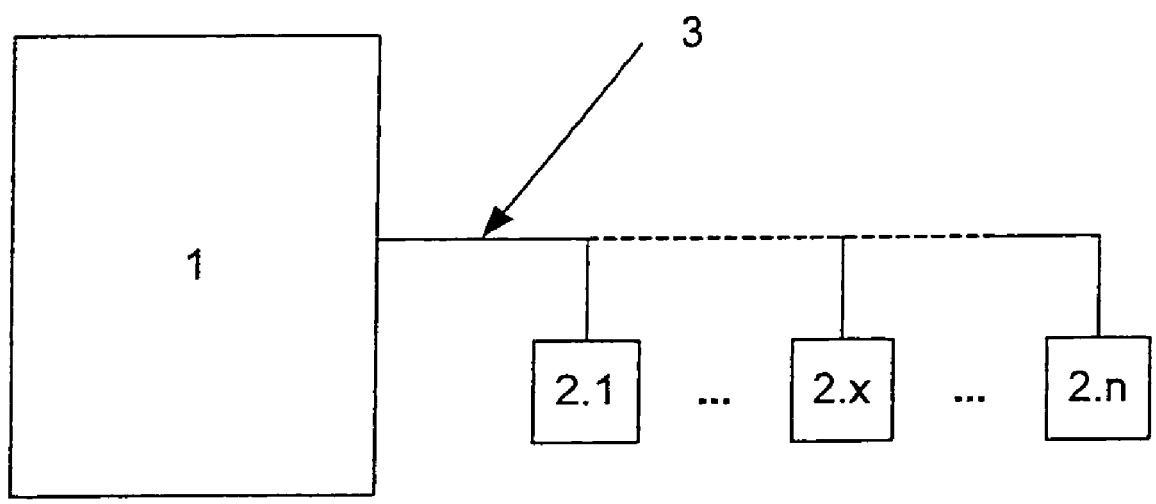
FIG. 1 bus system.

FIG. 1 sketches a bus system consisting of a central unit 1 as well as a plurality of modules 2.1 . . . 2.n, that are connected with the central unit 1 via one (or more) bus line(s) 3 for the data exchange. The structure of the bus system, sketched as a conductor line here in FIG. 1, in this context is freely selectable and the invention is utilizable for all bus architectures, especially also for the ring, daisy-chain or parallel bus systems. This bus system finds application for the data exchange between a central unit of an occupant protection system in a vehicle as well as the modules connected upstream of sensors and/or occupant protection devices for the data exchange.

Figure 3:
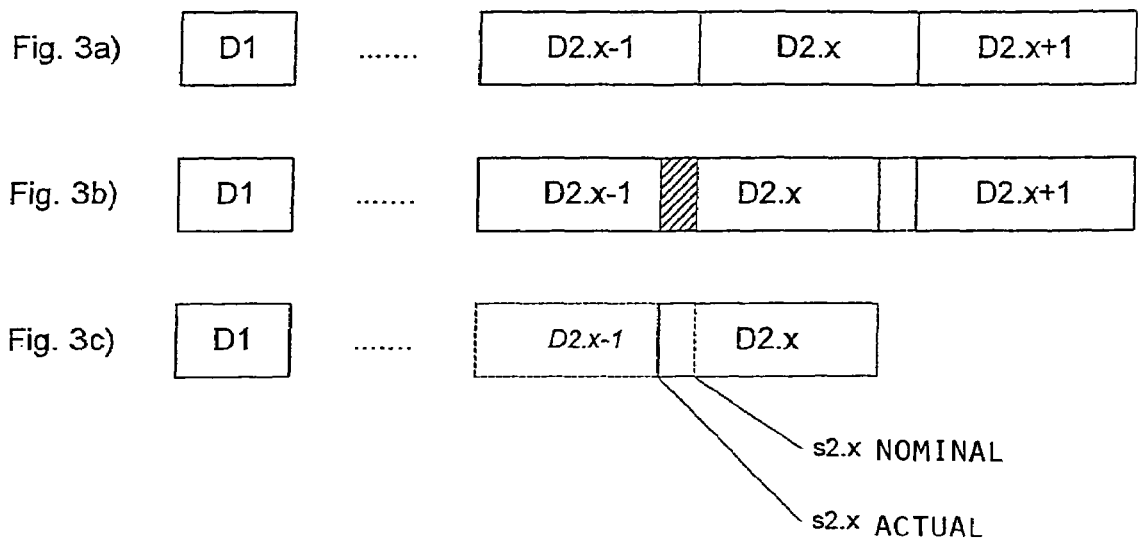
FIG. 3 sketch of the testing of the position of the transmitted data in the protocol frame.

For each module, for example the module 2.x in FIG. 1, an allocated position D2.x (compare FIG. 3) is stored in memory within the data protocol frame and at least one command for a data request (D1 in FIG. 3) is provided, in response to which the modules in the error-free condition in the normal operation transmit data to the central unit 1 and/or the other modules 2.1 . . . 2.n.

Preferably, at least for a group of modules 2.1 . . . 2.n, a data request D1 directed in common to this group, thus a so-called polling request, can be used, in response to which the modules 2.1 . . . 2.n of the group respectively transmit their data successively one after another to their position D2.1 . . . D2.n. Without further efforts, all modules 2.1 . . . 2.n can also be read-out via a single common polling request.

The special feature of the central unit 1 as well as also of the modules 2.1 . . . 2.n is that a command for silence, in short silence-command in the following, is provided, in response to which the modules 2.1 . . . 2.n in the error-free condition switch into a silent operating mode, and which expressly no longer transmit any data in response to the agreed data request D1.

By means of this silence-command, in a preferred further development of the method according to the claim 2 in connection with claim 1, at first all modules can be set into the silent operating mode and then by means of the agreed data requests it can be tested whether all modules still switch into the silent operating mode. The progress or flow thereof is sketched in FIG. 2 up to the first testing step "testing whether a module replies". This testing connected upstream makes it possible to recognize so-called babbling idiots, i.e. continuously transmitting modules. Via the header information of the data return-transmitted by the module, this module suffering interference can be identified and an error routine can be started. At that time, a deactivation of the respective module is provided.

Figure 2:
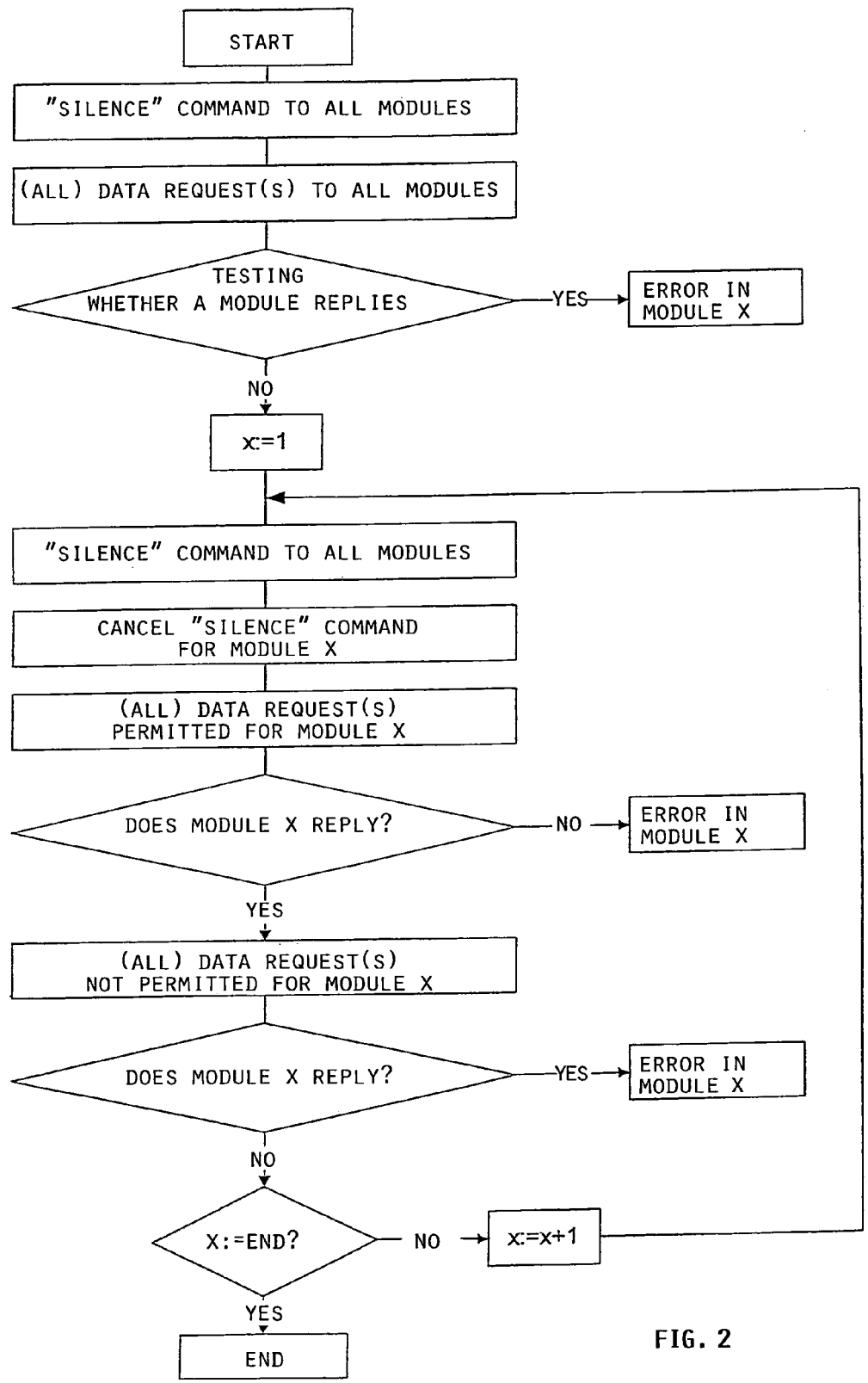
FIG. 2 schematic flow diagram of the preferred further developed method.

Subsequently, as in FIG. 2 as a loop process with a running variable x from 1 to n (n=number of the modules), respectively all modules except for a module (2.x) to be tested are set into the silent operating mode, and in connection with data requests agreed for this module to be tested and/or not agreed for this module, it is tested whether the module transmits its data in response to the agreed data request(s) and remains silent in response to the not-agreed data requests. If the same data request is allocated to all modules, then it can be tested via a pause time or a feigned deviating data request, whether the modules correspondingly react thereto, i.e. no longer transmit. The switch-over into the silent operating mode may be carried out, for example as sketched in FIG. 2, in such a manner that at first all modules 2.1 . . . 2.n receive the silence-command, and this is again lifted subsequently respectively for the module 2.x that is to be tested. Additionally, a command for the lifting of the silent operating mode is still provided to all modules 2.1 to 2.n in common.

Additionally, during the testing, the position $S2.X_{actual}$ of the return-transmitted data D2.x for the module (2.x) to be tested can be determined and compared with a nominal or desired position $s2.x_{nominal}$, which is not possible as a rule in the normal operation. Such a step would be integratable in FIG. 2, for example in the testing "Does module x reply?" to "(all) data request(s) authorized for the module x". The position testing, however, becomes especially apparent in connection with FIG. 3. Thus, at first an error-free data transmission of the module 2.x in response to the data request D1 to position D2.x is sketched in FIG. 3a, whereby the data transmission of the other modules, sketched here for 2.x−1 and 2.x +1, precedes or follows.

If, in the normal operation, there arises an erroneous position allocation or, as sketched in FIG. 3b, a shifting of the beginning of transmission from $s2.x_{nominal}$ to $s2.x_{actual}$, then there arises in each case a superposition (illustrated with diagonal hatching) of the data of two modules (here D2.x−1 & D2.x). Thereby, the data not only become unusable, it is also not unambiguously recognizable whether now the module 2.x−1 or the module 2.x is faulty. The silence command is especially useful exactly at this point, because it becomes possible, that only the module 2.x transmits, and one can thus recognize the shifting of the transmission beginning from $s2.x_{nominal}$ to $s2.x_{actual}$ in the position range D2.x−1 for the module 2.x−1, as illustrated in FIG. 3c. The position range D2.x−1 for the module 2.x−1 is illustrated with dashed lines in FIG. 3c, since module 2.x−1 is expressly not transmitting of course due to the silence-command.

The invention claimed is:

1. A method for testing an error-free function of modules (2.1 . . . 2.n) in a bus system with a central unit (1) for exchanging data by means of a data protocol frame, a) whereby an allocated position (D2.x) within the data protocol frame is prescribed for each module (2.x), b) at least one data request (D1) is agreed-upon, in response to which at least one of the modules (2.x) in the error-free condition in the normal operation transmits data to the central unit (1) and/or the other modules (2.1 . . . 2.n), c) characterized by providing a command for silence in response to which the modules (2.1 . . . 2.n) in the error-free condition switch into a silent operating mode and transmit no data in response to the agreed data request (D1), d) initially setting all modules (2.1 . . . 2.n) into the silent operating mode, e) subsequently transmitting the agreed data request (D1), and f) in connection therewith testing whether one of the modules (2.1 . . . 2.n) transmits data in response to the agreed data request (D1) despite the silent operating mode.

2. The method according to claim 1, whereby respectively also the position (s2.x actual) of the transmitted data is detected and compared with the prescribed position (s2.x nominal).

3. A method for testing an error-free function of modules (2.1 . . . 2.n) in a bus system with a central unit (1) for the data exchange by means of a data protocol frame, a) whereby an allocated position (D2.x) within the data protocol frame is prescribed for each module (2.x), b) for each module (2.x) at least one data request (D1) is agreed-upon, in response to which this module (2.x) in the error-free condition in the normal operation transmits data to the central unit (1) and/or the other modules (2.1 . . . 2.n), c) characterized by providing a command for silence in response to which the modules (2.1 . . . 2.n) in the error-free condition switch into a silent operating mode and transmit no data in response to the agreed data request (D1), d) respectively setting all of the modules (2.1 . . . , 2.x , . . . 2.n) except for a module (2.x) to be tested into the silent operating mode, e) subsequently transmitting at least one data request (D1) agreed-upon for this module (2.x) to be tested, and f) in connection therewith testing whether the module (2.x) transmits its data in response to the agreed data request.

4. The method according to claim 3, characterized in that, b1) for one module (2.x) at least one first data request (D1) is agreed-upon, in response to which the module (2.x) in the error-free condition in the normal operation transmits data to the central unit (1) and/or the other modules (2.1 . . . 2.n), b2) a second data request is provided, but not agreed-upon for this module (2.x), d) and respectively all modules (2.1 . . . , 2.x , . . . 2.n) except for this module (2.x) are set into the silent operating mode, e2) subsequently the second data request not agreed-upon for this module is transmitted, and f2) in connection therewith it is tested whether the module (2.x) is silent in response to the not-agreed second data request.

5. The method according to claim 3, whereby respectively also the position (s2.x actual) of the transmitted data is detected and compared with the prescribed position (s2.x nominal).

6. A central unit (1) for a bus system for exchanging data with a plurality of modules (2.1 . . . 2.n) by means of a data protocol frame, whereby in the central unit (1) a) for each module (2.x) an allocated position (D2.x) within the data protocol frame is stored in memory, b) at least one command for a data request (D1) is provided, in response to which the modules in an error-free condition in the normal operation transmit data to the central unit (1) and/or the other modules (2.1 . . . 2.n), characterized in that c) the central unit is configured for the transmitting of a command for silence, in response to which the modules (2.1 . . . 2.n) in the error-free condition switch into a silent operating mode and transmit no data in response to the agreed data request (D1).

7. A module (2.1 . . . 2.n) for a bus system for exchanging data between a central unit (1) and a plurality of these modules (2.1 . . . 2.n) by means of a data protocol frame, whereby a) in each module (2.x) an allocated position (D2.x) within the data protocol frame is stored in memory, b) at least one command for a data request (D1) is provided, in response to which the module (2.x) in an error-free condition in the normal operation transmits data to the central unit (1) and/or the other modules characterized in that c) the module (2.x) is configured in such a manner so that, in response to a command for silence, in the error-free condition, it switches into a silent operating mode and transmits no data in response to the agreed data request (D1).

8. A bus system comprising a plurality of modules according to claim 7 and a central unit for exchanging data with the plurality of modules by means of a data protocol frame, whereby in the central unit (1) a) for each module (2.x) an allocated position (D2.x) within the data protocol frame is stored in memory, b) at least one command for a data request (D1) is provided, in response to which the modules in the error-free condition in the normal operation transmit data to the central unit (1) and/or the other modules (2.1 . . . 2.n), characterized in that c) the central unit is configured for the transmitting of a command for silence, in response to which the modules (2.1 . . . 2.n) in the error-free condition switch into a silent operating mode and transmit no data in response to the agreed data request (D1), and d) the modules are connected via a bus line (3) with the central unit (1) for the data exchange.

9. The bus system according to claim 8, characterized in that at least for one group of modules (2.1 . . . 2.n), a data request (polling-request) (D1) directed in common to this group is provided, in response to which the modules (2.1 . . . 2.n) transmit their data successively one after another respectively to their position (D2.1 . . . D2.n).

10. An occupant protection system in a vehicle including a bus system according to claim 8, with a central unit (1) as well as modules (2.1 . . . 2.n) of sensors and/or occupant protection devices, characterized in that the data exchange between the central unit (1) and the modules (2.1 . . . 2.n) is carried out by means of the bus system.

* * * * *